(12) United States Patent
Edler et al.

(10) Patent No.: US 11,560,855 B2
(45) Date of Patent: Jan. 24, 2023

(54) FLAP DEVICE

(71) Applicant: FRIEDRICH BOYSEN GMBH & CO. KG, Altensteig (DE)

(72) Inventors: Michael Edler, Haiterbach (DE); Volker Roller, Simmersfeld (DE); Karl Stockinger, Ebhausen (DE)

(73) Assignee: FRIEDRICH BOYSEN GMBH & CO. KG, Altensteig (DE)

( * ) Notice: Subject to any disclaimer, the term of this patent is extended or adjusted under 35 U.S.C. 154(b) by 0 days.

(21) Appl. No.: 17/166,690

(22) Filed: Feb. 3, 2021

(65) Prior Publication Data
US 2021/0246841 A1 Aug. 12, 2021

(30) Foreign Application Priority Data
Feb. 11, 2020 (DE) .......................... 102020103420.2

(51) Int. Cl.
*F02D 9/10* (2006.01)
*F02D 9/04* (2006.01)
*F16K 1/22* (2006.01)

(52) U.S. Cl.
CPC .............. *F02D 9/04* (2013.01); *F02D 9/1005* (2013.01); *F02D 9/1065* (2013.01); *F16K 1/224* (2013.01)

(58) Field of Classification Search
CPC ... F16K 1/22; F16K 1/224; F02D 9/04; F02D 9/08; F02D 9/106; F02D 9/1065
(Continued)

(56) References Cited

U.S. PATENT DOCUMENTS 6,598,854 B1* 7/2003 Jessberger ............ F02D 9/1015
251/305
2006/0059902 A1* 3/2006 Gerards .................... F02D 9/04
60/324
(Continued)

FOREIGN PATENT DOCUMENTS

DE 102006048713 A1 4/2008
DE 102011107088 A1 1/2013
(Continued)

OTHER PUBLICATIONS

German Patent Office Search Report for German Patent Application No. 102020103420.2 dated Sep. 10, 2020, 7 pages.
(Continued)

*Primary Examiner* — Robert K Arundale
(74) *Attorney, Agent, or Firm* — Dickinson Wright PLLC

(57) ABSTRACT

A flap device for a motor vehicle comprises a flap housing that can be flowed through by a gas flow; and a flap shaft that is rotatably supported about an axis of rotation in the flap housing by means of at least a first and a second bearing element, which are held at the flap housing, and that carries a flap for selectively blocking or throttling the gas flow. The flap shaft is supported at the first bearing element in a first axial direction via a fixed abutment element that is axially fixedly arranged with respect to the flap shaft. The flap shaft is supported at the second bearing element in a second axial direction, which is oriented opposite the first axial direction, via a movable abutment element that is axially displaceably seated on the flap shaft, with the movable abutment element being preloaded in a direction toward the second bearing element by means of a spring device, and with the spring device in this respect being supported at a support surface fixed to the shaft and thus pressing the fixed abutment element against the first bearing element.

20 Claims, 5 Drawing Sheets

(58) Field of Classification Search
USPC .......................................................... 251/305
See application file for complete search history.

(56) References Cited

U.S. PATENT DOCUMENTS

| | | | |
|---|---|---|---|
| 2006/0059903 A1* | 3/2006 | Gerards | F02D 9/04 |
| | | | 60/324 |
| 2012/0193562 A1* | 8/2012 | Takai | F02M 26/74 |
| | | | 251/214 |
| 2015/0083956 A1* | 3/2015 | Gerards | F16K 1/224 |
| | | | 251/308 |
| 2017/0138274 A1* | 5/2017 | Stark | F02D 9/04 |
| 2017/0159828 A1* | 6/2017 | Sanches | F16K 1/224 |
| 2019/0032607 A1* | 1/2019 | Stockinger | F02B 37/183 |

FOREIGN PATENT DOCUMENTS

| | | |
|---|---|---|
| DE | 102013013387 A1 | 9/2014 |
| DE | 102013103105 A1 | 10/2014 |
| DE | 102018204431 A1 | 9/2019 |

OTHER PUBLICATIONS

European Search Report dated Jul. 2, 2021 for European Application No. 21153280.9, 3 pages.

\* cited by examiner

FLAP DEVICE

The present invention relates to a flap device for a motor vehicle, in particular to an exhaust gas flap device, said flap device comprising a flap housing that can be flowed through by a gas flow; and a flap shaft that is rotatably supported about an axis of rotation in the flap housing by means of at least a first and a second bearing element, which are held at the flap housing, and that carries a flap for selectively blocking or throttling the gas flow, wherein the flap shaft is supported at the first bearing element in a first axial direction via a fixed abutment element that is axially fixedly arranged with respect to the flap shaft.

Such devices are, for example, used for selectively closing exhaust gas paths in exhaust gas systems of motor vehicles. The flap located in the flap housing can typically be rotated between a position releasing the exhaust gas flow and a position blocking the exhaust gas flow. A partial or complete blocking of the exhaust gas flow can, for example, take place within the framework of the acoustic design of exhaust gas systems or for the targeted generation of a counter-pressure. Exhaust gas valves can also be used within the framework of an exhaust gas return system for the reduction of nitrogen oxide within the engine, for example, to apply a certain quantity of exhaust gas to a low-pressure path at the fresh air side of an internal combustion engine.

The axial support of the flap shaft at the first bearing element ensures an exact positioning of the flap shaft and counteracts an unwanted gas discharge from the flap housing. The second bearing element is typically configured to form a floatable bearing to enable a compensation of thermally induced relative movements between the flap shaft and the flap housing. As a result of pressure pulsations in the flap housing, movements of the flap shaft within the bearing clearance can occur during the operation of the associated exhaust gas system. A repeated lifting of the flap shaft from the sealing abutment with a subsequent repeated knocking in each case is in particular possible at certain pulsation frequencies. This leads to unwanted, for example rattling and/or clattering, background noise. Such background noise occurs more frequently in exhaust gas systems with a low damping volume and a correspondingly reduced reduction of alternating charge pulsations.

Furthermore, there is a desire with common flap devices to improve the sealing in the region of the shaft lead-throughs.

It is an object of the invention to provide a flap device of the initially named kind that is also low-noise on the presence of relatively strong pulsations and that reliably prevents a gas discharge from the flap housing.

The object is satisfied by a flap device having the features of claim 1.

In accordance with the invention, provision is made that the flap shaft is supported at the second bearing element in a second axial direction, which is oriented opposite the first axial direction, via a movable abutment element that is axially displaceably seated on the flap shaft, with the movable abutment element being preloaded in a direction toward the second bearing element by means of a spring device, and with the spring device in this respect being supported at a support surface fixed to the shaft and thus pressing the fixed abutment element against the first bearing element.

The spring device presses the fixed abutment element against the first bearing element and at the same time presses the movable abutment element against the second bearing element. The combination of flap and flap shaft is thus axially supported in both bearings using a single spring device. Pressure fluctuations acting on the flap first have to overcome the frictional forces between the abutment elements and the bearing elements before relative movements between the flap shaft and the flap housing and thus the above-mentioned background noise can occur. The spring hardness of the spring device can be selected such that excitations with frequently occurring frequencies and amplitudes are counteracted in a particularly pronounced manner. However, axial compensation movements of the flap shaft are possible in principle while overcoming the spring force so that unwanted distortions due to thermal expansion movements are avoided. Since only one spring device is required for the axial support of the flap shaft at two bearing elements, a flap device in accordance with the invention is particularly simple and inexpensive to manufacture, The flap shaft can be radially guided by the bearing elements. The axis of rotation preferably extends transversely to the flow direction. The flap shaft can extend through the flap housing transversely to the flow direction. The axis of rotation can in particular coincide with a longitudinal axis of the flap shaft. To ensure a reliable support, the bearing elements can be arranged at mutually oppositely disposed points of the flap housing.

In the present disclosure, the terms "axial" and "radial" are to be understood with reference to the axis of rotation.

An embodiment of the invention provides that the fixed abutment element directly contacts the first bearing element and/or the movable abutment element directly contacts the second bearing element. This enables a particularly simple and compact design. In general, the fixed abutment element and/or the movable abutment element could, however, be supported at the respective bearing element via one or more intermediate elements.

A further embodiment of the invention provides that the first bearing element has an end face facing away from the flap housing and the fixed abutment element areally contacts the end face of the first bearing element; and/or that the second bearing element has an end face facing away from the flap housing and the movable abutment element areally contacts the end face of the second bearing element. An areal contact improves the sealing of the flap housing. The unwanted formation of leakage paths is in particular counteracted. The end faces can be planar and can contact associated planar surfaces of the bearing elements.

In accordance with a particular embodiment of the invention, the bearing elements are received in bearing bushings that are each fastened to the flap housing or are designed in one piece therewith. This design is particularly simple and compact. The bearing bushings are preferably fastened to the flap housing in a bonded manner. The bearing bushings can in particular be fastened to an outer side of the flap housing.

Provision can be made that the first and/or second bearing element projects/project beyond the respective bearing bushings in an axial direction facing away from the flap housing. This enables a contacting of the abutment elements with the bearing elements without a contact comprising background noise taking place between the abutment elements and the bearing bushings.

Provision can be made that the first bearing element and/or the second bearing element is/are at least partly produced from graphite to reduce the friction. The graphite can have a hexagonal layer structure.

The flap device preferably comprises an actuating drive, in particular an electric actuating drive, for a power-operated rotation of the flap shaft. By means of such an actuating drive, the flap can be set into predefined rotational positions during the operation of the associated exhaust gas system in dependence on control signals in order thus to control the exhaust gas flow in a desired manner.

The second bearing element is preferably arranged at a side of the flap housing facing the actuating drive. It has namely proved to be favorable to provide the support via the movable abutment element on the driven side of the flap shaft since the fixing by the actuating drive anyway restricts the freedom of movement of the flap shaft in this region so that an additional fixing by a fixed abutment in this region is not necessary.

The actuating drive is preferably in a drive-effective connection with the flap shaft via a coupling that comprises two coupling parts that are axially displaceable with respect to one another. The load and the wear of the bearings of the actuating drive are thereby reduced. The coupling parts can in particular engage into one another in a claw-like manner.

The coupling parts are preferably coupled via an entrainer device that is effective in at least one direction of rotation, with a coupling spring preloading the coupling parts relative to one another against the direction of rotation. On the one hand, a clearance-free torque transmission is ensured, and thus the noise formation on the actuation of the flap is reduced, by such a preload; on the other hand, the heat transfer between the flap and the actuating drive is reduced due to the design of the coupling in the form of two separate coupling parts. The coupling spring can be integrated into the spring device or can be designed as an independent component.

A further embodiment of the invention provides that the movable abutment element is cup-like and has a cup opening facing away from the second bearing element. The spring device and/or a coupling spring can be arranged in the cup-like movable abutment element, whereby a particularly compact design results.

A sealing element can be seated on the flap shaft and contacts an axial end face of the movable abutment element. This prevents a gas discharge in the contact region between the flap shaft and the movable abutment element. The sealing element can be at least partly produced from a wire mesh or can comprise a corrugated bellows.

A further embodiment of the invention provides that the first bearing element and the fixed abutment element are sealed with respect to the outer space by a cover element that is fastened in a gas-tight manner to the flap housing. It is thereby possible to ensure complete gas tightness at the bearing of the flap shaft that is remote from the drive. The cover element can, for example, be hood-shaped and can be welded to the flap housing along the margin of the hood.

In accordance with a further embodiment of the invention, the fixed abutment element and/or a support element having the support surface fixed to the shaft is/are fastened to the flap shaft in a bonded manner and/or is/are of disk shape. The fixed abutment element and/or the support element can in particular be metal disks that are welded to the flap shaft.

A particular embodiment of the invention provides that the fixed abutment element has a cone that cooperates with a complementary counter-cone of the first bearing element. Such a form-fitted contact between the fixed abutment element and the first bearing element improves the positioning and guidance of the flap shaft.

Further developments of the invention can also be seen from the dependent claims, from the description, and from the enclosed drawings.

The invention will be described in the following by way of example with reference to the drawings.

Figure 1:
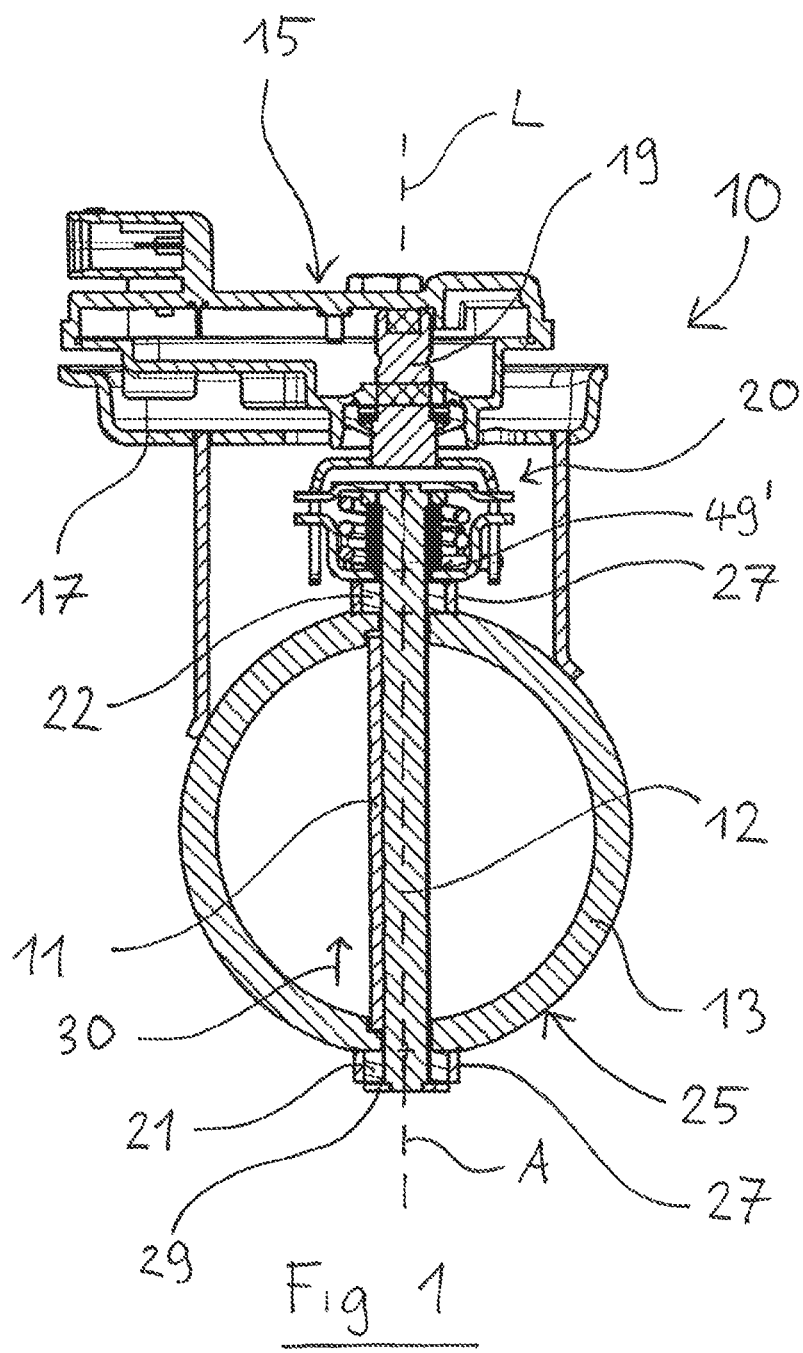
FIG. 1 is a lateral sectional view of a flap device in accordance with a first embodiment of the invention.

The flap device 10 shown in FIG. 1 and designed in accordance with the invention comprises a flap 11 that is supported by an elongate flap shaft 12. The flap shaft 12 is rotatably supported about an axis of rotation A in a flap housing 13. The axis of rotation A here coincides with the longitudinal axis L of the flap shaft 12. The flap device 10 is preferably configured as an exhaust flap device for an exhaust gas system of a motor vehicle. Accordingly, the flap 11, the flap shaft 12, and the flap housing 13 are preferably produced from a heat-resistant metal. In the embodiment shown, the flap housing 13 is at least substantially cylindrical and the flap 11 is at least substantially of circular disk shape. However, depending on the application, other housing and flap shapes are also possible.

An electric actuating drive 15 is provided for rotating the flap 11 about the axis of rotation A and is accommodated in a drive housing 17 fastened to the flap housing 13. A drive shaft 19 of the electric actuating drive 15 is drive-effectively coupled to the flap shaft 12 via a coupling 20.

A first bearing element 21 and a second bearing element 22 are provided for rotatably supporting the flap shaft 12 in the flap housing 13 and, as shown, are arranged disposed opposite one another at the outer side 25 of the flap housing 13. The first bearing element 21 and the second bearing element 22 are annular and are seated on the flap shaft 12. They are preferably produced from a hard and friction-reducing material, in particular graphite. As shown, the first bearing element 21 and the second bearing element 22 are received in respective bearing bushings 27 that are welded to the outer side 25 of the flap housing 13.

The flap shaft 12 is supported at the first bearing element 21 via a fixed abutment element 29 in a first axial direction 30 that faces in the direction of the electric actuating drive 15 in the embodiment shown. The fixed abutment element 29 is preferably disk-shaped. It can be fastened to the flap shaft 12 in a bonded manner, for example welded thereto. Alternatively, it can be molded to the flap shaft 12.

Figure 2:
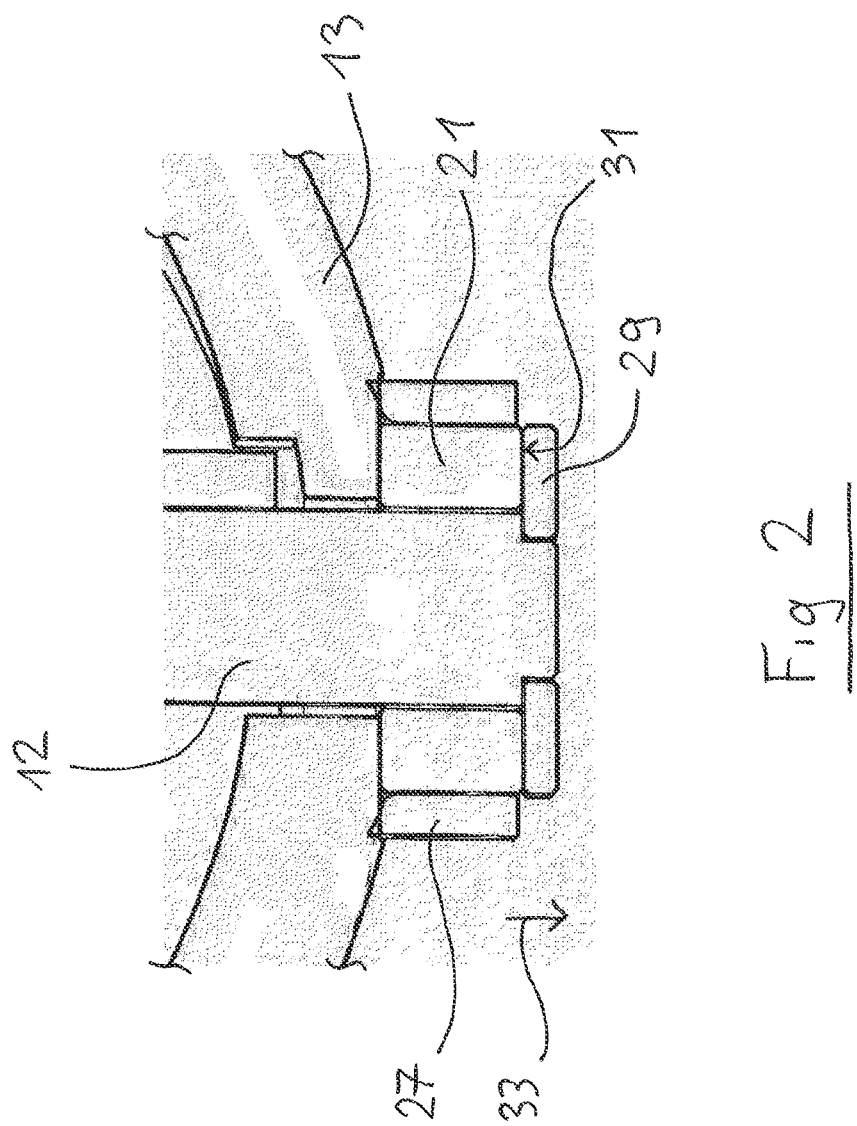
FIG. 2 shows a first bearing element of the flap device in accordance with FIG. 1 in an enlarged view.

As can be recognized in FIG. 2, the fixed abutment element 29 areally contacts a planar end face 31 of the first bearing element 21 that faces away from the flap housing 13. To prevent a contact comprising background noise between the fixed abutment element 29 and the bearing bushing 27, the first bearing element 21 projects beyond the bearing bushing 27 in a direction 33 facing away from the flap housing 13. That is, there is a gap between the bearing bushing 27 and the fixed abutment element 29.

Figure 3:
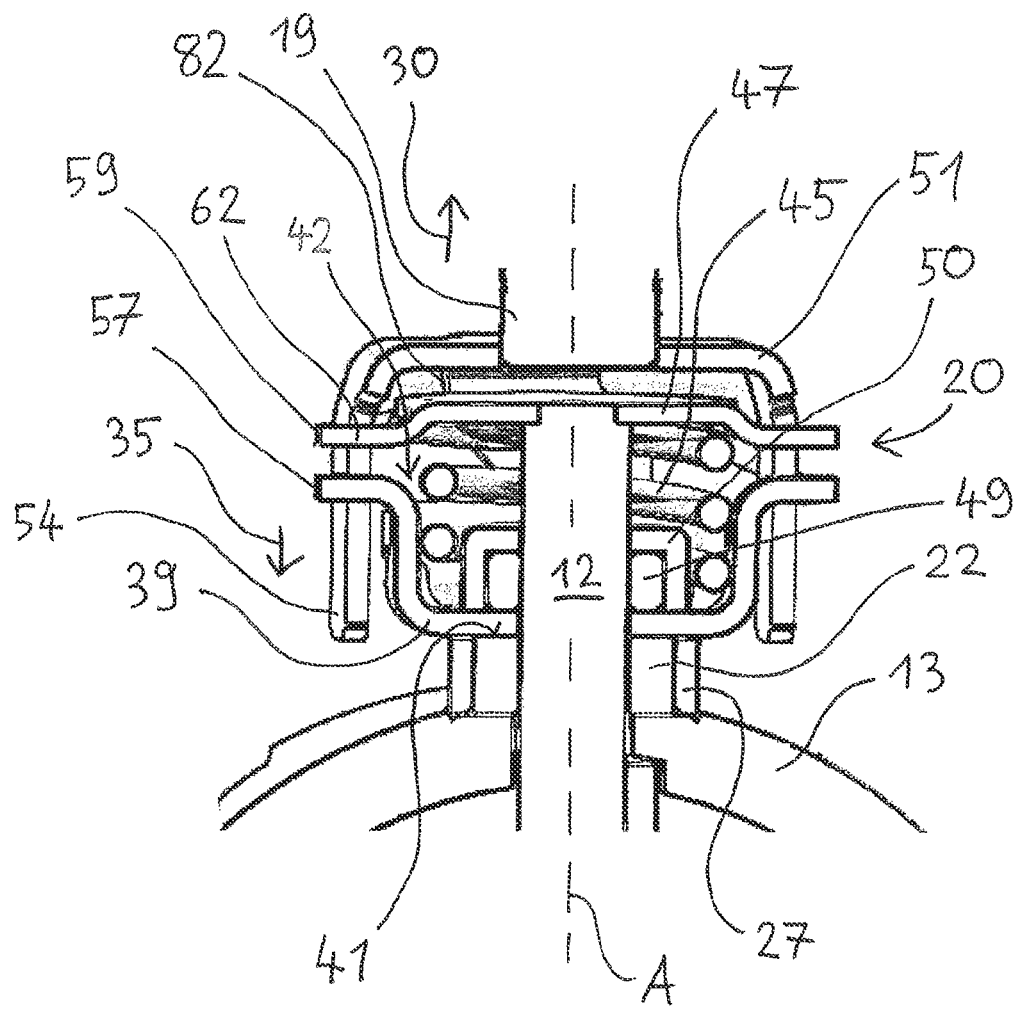
FIG. 3 shows a second bearing element and a coupling of the flap device in accordance with FIG. 1 in an enlarged view.
Figure 4:
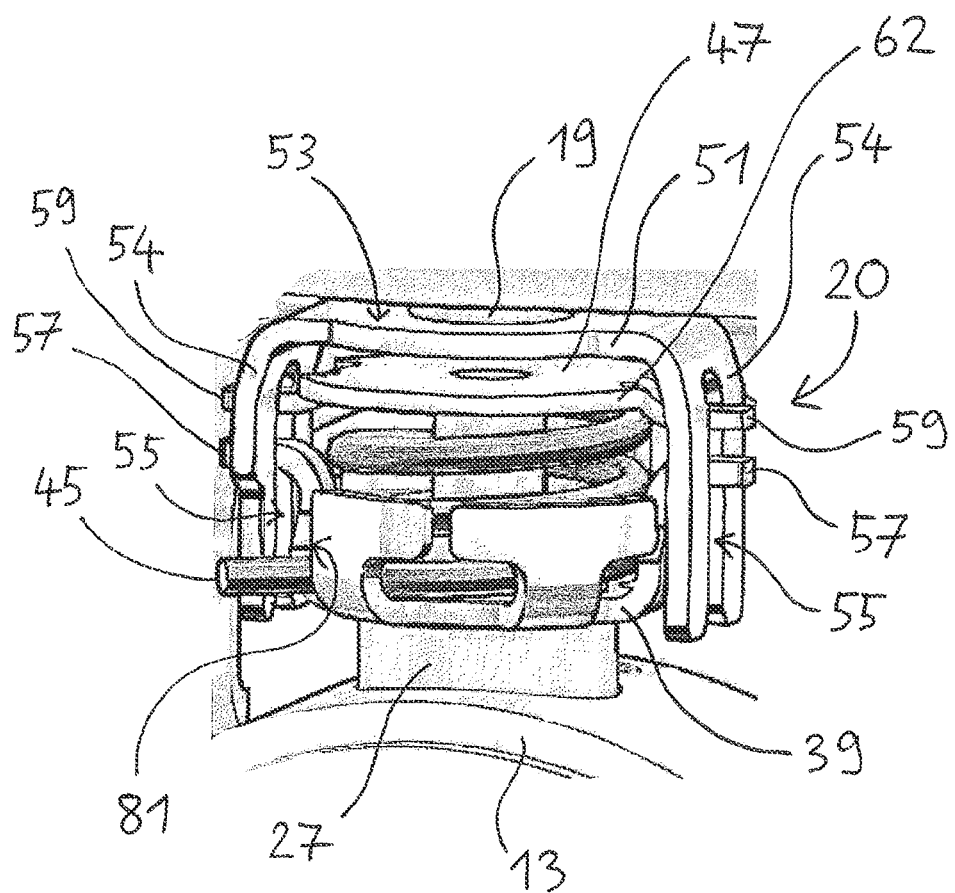
FIG. 4 shows the coupling in accordance with FIG. 2 in a perspective view.

As can in particular be seen from the enlarged representations in accordance with FIGS. 3 and 4, a movable abutment element 39 is provided in the region of the second bearing element 22, said abutment element 39 being axially displaceably seated on the flap shaft 12 and areally contacting a planar end face 41 of the second bearing element 22 that faces away from the flap housing 13. As shown, the movable abutment element 39 is cup-shaped and has a cup opening 42 facing away from the second bearing element 22. A helical spring 45 is inserted into the cup-like movable abutment element 39 under an axial preload. It is supported at a support element 47, which is welded to the flap shaft 12, in the first axial direction 30. In the opposite second axial direction 35, the helical spring 45 is supported at the movable abutment element 39.

A gap is also present between the second bearing element 22 and the movable abutment element 39.

Due to the spring action of the tensioned helical spring 45, the movable abutment element 39 is pressed against the planar end face 41 of the second bearing element 22, on the one hand, and the fixed abutment element 29 (FIG. 2) is pulled toward the planar end face 31 of the first bearing element 21, on the other hand. The flap shaft 12 is thereby axially fixed in the flap housing 13. However, axial relative movements between the flap shaft 12 and the flap housing 13 are possible to a certain extent on the overcoming of the spring force. Different thermal expansions can thereby be compensated if required.

At a side of the movable abutment element 39 remote from the flap housing 13, an annular sealing element 49 is arranged as shown in FIG. 3. It is received in a sleeve 50 and is seated together therewith on the flap shaft 12. The sleeve 50 is fastened to the base of the cup-like movable abutment element 39. The sealing element 49 can be produced from a wire mesh. Another variant of a sealing element 49' is shown in FIG. 1. This sealing element 49' is designed as a corrugated bellows and is not received in a sleeve. Due to the sealing element 49, 49', leakage flows between the flap shaft 12 and the movable abutment element 39 are avoided.

The design of the coupling 20 will be described in the following with reference to FIG. 4. A first coupling part 51 of the coupling 20 is fastened to the drive shaft 19 of the electric actuating drive 15 (FIG. 1). The first coupling part 51 has a plate-like base section 53 from which two axial projections 54 project. A groove 55 is formed in each of these. Two radial projections 57 are molded to the movable abutment element 39 and project outwardly in opposite directions. Equally, two radial projections 59 project outwardly from the support element 47 in opposite directions. Both the radial projections 57 of the movable abutment element 39 and the radial projections 59 of the support disk 47 engage into the grooves 55 and thus provide a form-fitted connection between the first coupling part 51 and the flap shaft 12. The support element 47 thus forms a second coupling part 62 of the coupling 20.

The helical spring 45 is not only used under an axial preload between the movable abutment element 39 and the support disk 47, but it also has a torsional stress that preloads the movable abutment element 39 with respect to the support disk 47 in a direction of rotation. The torsional clearance of the coupling 20 is pushed away by the helical spring 45 that, on the one hand, is supported at a nose 81 (FIG. 4) of the movable abutment element 39 for this purpose and, on the one hand, at a nose 82 (FIG. 3) of the first coupling part 51. Since there are only selective contacts between the first coupling part 51 and the second coupling part 62, the heat transfer from the flap shaft 12 to the drive shaft 19 of the electric actuating drive 15 occurring during the operation is only slight. The electric actuating drive 15 is thus protected from thermal stress.

Figure 5:
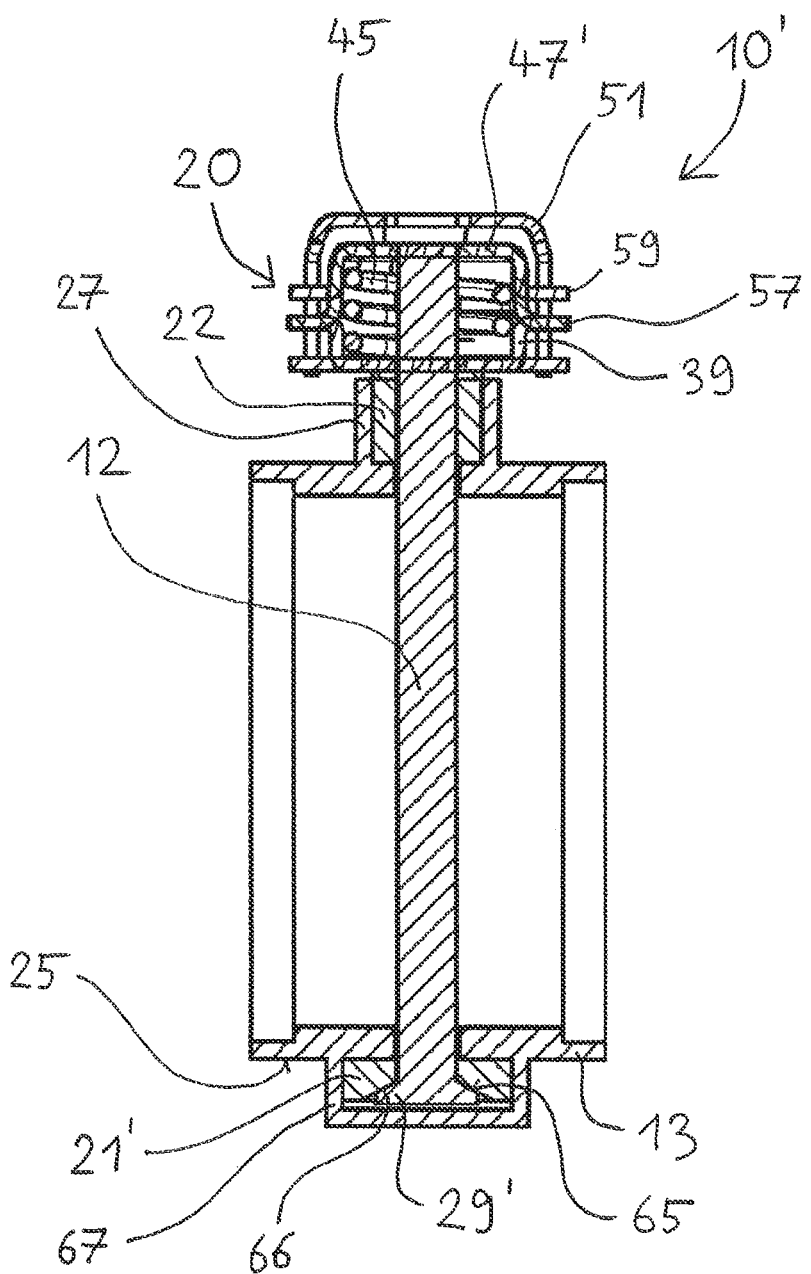
FIG. 5 is a lateral sectional view of a flap device in accordance with a second embodiment of the invention.

In FIG. 5, an alternative embodiment of a flap device 10' in accordance with the invention is shown that has a similar design to the previously described flap device 10. The flap device 10' shown in FIG. 5 in particular has a flap shaft 12, a flap housing 13, a first bearing element 21', and a second bearing element 22. As in the previously described embodiment, the second bearing element 22 is received in a bearing bushing 27. The coupling 20 is likewise similar in design to the previously described embodiment, but unlike the latter it has a cup-like support element 4T in which the helical spring 45 is received. The fixed abutment element 29' differs from the fixed abutment element 29 in accordance with FIG. 1 in that it has a cone 65 which cooperates with a counter-cone 66 of the first bearing element 21'. The radial and axial fixing of the flap shaft 12 in the flap housing 13 is thereby improved.

A further difference from the embodiment in accordance with FIG. 1 is that a hood-shaped cover element 67 is provided for the first bearing element 21' instead of a bearing bushing. The cover element 67 is welded to the outer side 25 of the flap housing 13 such that it completely covers the first bearing element 21'. Even if leakage flows occur between the first bearing element 21' and the flap shaft 12, no gas discharge to the outside is to be feared.

A flap device 10, 10' in accordance with the invention can in particular be integrated into an exhaust gas system of a motor vehicle. No unwanted noise generation by the flap device 10, 10' occurs on an operation of the motor vehicle, even in the event that strong pressure pulsations occur, since the flap shaft 12 is axially supported at both mutually oppositely disposed bearing points. However, due to the movable abutment element 39, only a helical spring 45 is required. Unwanted leakage flows are effectively prevented due to the areal contact of the fixed abutment element 29, 29' and the movable abutment element 39 with the respective planar end faces 31, 41 of the first bearing element 21, 21' and the second bearing element 22.

REFERENCE NUMERAL LIST

10, 10' flap device
11 flap
12 flap shaft
13 flap housing
15 electric actuating drive
17 drive housing
19 drive shaft
20 coupling
21, 21' first bearing element
22 second bearing element
25 outer side
27 bearing bushing
29, 29' fixed abutment element
30 first axial direction
31 planar end face
33 direction facing away from the flap housing
35 second axial direction
39 movable abutment element
41 planar end face
42 cup opening
45 helical spring
47, 47' support element
49, 49' sealing element
50 sleeve
51 first coupling part
53 plate-shaped base section
54 axial projection
55 groove
57 radial projection
59 radial projection
62 second coupling part
65 cone
66 counter-cone
67 cover element
A axis of rotation
L longitudinal axis

The invention claimed is:

1. A flap device for a motor vehicle, said flap device comprising a flap housing that can be flowed through by a gas flow; and a flap shaft that is rotatably supported about an axis of rotation in the flap housing by a first and a second bearing element, which are held at the flap housing, and that carries a flap for selectively blocking or throttling the gas flow, wherein the flap shaft is supported at the first bearing element in a first axial direction via a fixed abutment element that is axially fixedly arranged with respect to the flap shaft, wherein the fixed abutment element is fixed against relative movement with the flap shaft, wherein the flap shaft is supported at the second bearing element in a second axial direction, which is oriented opposite the first axial direction, via a movable abutment element that is axially displaceable along the flap shaft, with the movable abutment element being preloaded in a direction toward the second bearing element by a spring device, and with the spring device being supported at a support element fixed to the flap shaft, with the spring device pressing the fixed abutment element against the first bearing element.

2. The flap device in accordance with claim 1, wherein the flap device is an exhaust gas flap device.

3. The flap device in accordance with claim 1, wherein the fixed abutment element directly contacts the first bearing element.

4. The flap device in accordance with claim 1, wherein the movable abutment element directly contacts the second bearing element.

5. The flap device in accordance with claim 3, wherein the first bearing element has an end face facing away from the flap housing and the fixed abutment element contacts the end face of the first bearing element and/or
wherein the second bearing element has an end face facing away from the flap housing and the movable abutment element contacts the end face of the second bearing element.

6. The flap device in accordance with claim 4, wherein the first bearing element has an end face facing away from the flap housing and the fixed abutment element contacts the end face of the first bearing element and/or
wherein the second bearing element has an end face facing away from the flap housing and the movable abutment element contacts the end face of the second bearing element.

7. The flap device in accordance with claim 1, wherein the first and second bearing elements are received in bearing bushings that are each fastened to the flap housing or are designed in one piece therewith.

8. The flap device in accordance with claim 7, wherein at least one of the first bearing element and the second bearing element projects beyond the respective bearing bushings in an axial direction facing away from the flap housing.

9. The flap device in accordance with claim 1, wherein at least one of the first bearing element and the second bearing element is at least partly produced from graphite.

10. The flap device in accordance with claim 1, wherein the flap device comprises an actuating drive for a power-operated rotation of the flap shaft.

11. The flap device in accordance with claim 10, wherein the actuating drive is an electric actuating drive.

12. The flap device in accordance with claim 10, wherein the second bearing element is arranged at a side of the flap housing facing the actuating drive.

13. The flap device in accordance with claim 10, wherein the actuating drive is in a drive-effective connection with the flap shaft via a coupling that comprises two coupling parts that are axially displaceable with respect to one another.

14. The flap device in accordance with claim 13, wherein the two coupling parts are coupled via an entrainer device that is effective in at least one direction of rotation, with the spring device preloading the two coupling parts relative to one another against the direction of rotation.

15. The flap device in accordance with claim 1, wherein the movable abutment element is cup-like and has a cup opening facing away from the second bearing element.

16. The flap device in accordance with claim 1, wherein a sealing element is seated on the flap shaft and contacts an axial end face of the movable abutment element.

17. The flap device in accordance with claim 1, wherein the first bearing element and the fixed abutment element are sealed with respect to the outer space by a cover element that is fastened in a gas-tight manner to the flap housing.

18. The flap device in accordance with claim 1, wherein at least one of the fixed abutment element and the support element fixed to the shaft is fastened to the flap shaft against relative movement with the shaft via being bonded or welded to the shaft, or via being molded to the shaft.

19. The flap device in accordance with claim 1, wherein at least one of the fixed abutment element and the support element fixed to the shaft is of disk shape.

20. The flap device in accordance with claim 1, wherein the fixed abutment element has a cone that cooperates with a complementary counter-cone of the first bearing element.

* * * * *